United States Patent [19]

Sugiyama et al.

[11] Patent Number: 4,467,464
[45] Date of Patent: Aug. 21, 1984

[54] ROTARY RECORDING MEDIUM REPRODUCING APPARATUS

[75] Inventors: Hiroyuki Sugiyama, Isehara; Masaki Sakurai; Ryozo Abe, both of Yokohama; Kenji Yoshihara, Chiba, all of Japan

[73] Assignee: Victor Company of Japan, Ltd., Yokohama, Japan

[21] Appl. No.: 415,964

[22] Filed: Sep. 8, 1982

[30] Foreign Application Priority Data

Sep. 11, 1981 [JP] Japan .................................. 56-143333

[51] Int. Cl.$^3$ ........................ G11B 17/04; G11B 23/04
[52] U.S. Cl. .................................... 369/77.2; 360/133; 369/264
[58] Field of Search ...................... 369/77.2, 219, 220, 369/221, 262, 264; 360/97, 99, 133

[56] References Cited

U.S. PATENT DOCUMENTS 4,358,841 11/1982 Carroll et al. ...................... 369/77.2
4,410,973 10/1983 Saito et al. ......................... 369/77.2
4,413,333 11/1983 Saito .................................. 369/77.2

FOREIGN PATENT DOCUMENTS 2087128 5/1982 United Kingdom ............... 369/77.2

Primary Examiner—Steven L. Stephan

Attorney, Agent, or Firm—Ladas & Parry

[57] ABSTRACT

A rotary recording medium reproducing apparatus reproduces a rotary recording medium accommodated within a case, where the case comprises a jacket provided with a space for accommodating the rotary recording medium and an opening for allowing the rotary recording medium to go in and out of the jacket, and a lid member inserted through the opening of the jacket for closing the opening of the jacket. The rotary recording medium reproducing apparatus comprises a rotary recording medium supporting member for supporting the rotary recording medium left within the reproducing apparatus so that the rotary recording medium is supported above a turntable by an operation in which the case is inserted into and then extracted from the reproducing apparatus, a driving source for operating in one direction to raise the rotary recording medium supporting member and operating in a reverse direction to lower the rotary recording medium supporting member, and a control circuit for controlling the driving source to operate in the one direction when the control circuit detects the insertion of the jacket into the reproducing apparatus in a state where the rotary recording medium is supported by the supporting member and is being lowered with the supporting member operated by the driving source which is operating in the reverse direction.

7 Claims, 9 Drawing Figures

ROTARY RECORDING MEDIUM REPRODUCING APPARATUS

BACKGROUND OF THE INVENTION

The present invention generally relates to rotary recording medium reproducing apparatuses capable of placing and leaving a rotary recording medium in a state possible for reproduction within the rotary recording medium reproducing apparatus when a jacket (disc case) having a lid for accommodating the rotary recording medium therein is inserted into and then extracted from within the reproducing apparatus, and also capable of incasing the rotary recording medium within the jacket so that the rotary recording medium can be obtained outside the reproducing apparatus together with the jacket, when an empty jacket is inserted into and then extracted from within the reproducing apparatus. The present invention further and especially relates to the above type of a rotary recording medium reproducing apparatus provided with a disc lifter device for immediately raising and restoring a disc lifter which supports the rotary recording medium above a turntable to a position possible to recover the rotary recording medium, when the disc case is inserted into the reproducing apparatus while the disc lifter is moving down.

Conventionally, in an apparatus for reproducing a rotary recording medium (referring to video disc, PCM audio disc, and the like, and hereinafter simply referred to as a disc), there are types of apparatuses which reproduce a disc when the disc is loaded upon clamping and placing of the disc within the reproducing apparatus, by inserting and then extracting a disc case which has a lid and accommodates a disc therein from within the reproducing apparatus.

As a conventional apparatus of this type, a reproducing apparatus was proposed in a United States patent application Ser. No. 231,868, now U.S. Pat. No. 4,352,174, filed Feb. 5, 1981, entitled "DISC-SHAPED RECORDING MEDIUM REPRODUCING APPARATUS" in which the assignee is the same as that of the present application. This previously proposed reproducing apparatus operates together with a disc case comprising a jacket which has a shape for accommodating a disc and an opening for allowing the disc to go in and out of the jacket, and a lid member inserted through the opening of the jacket for closing the opening of the jacket. The reproducing apparatus comprises an inserting opening through which the case is inserted, a turntable for rotating the disc, clamping means for clamping at least one of the disc and the lid member provided at an innermost part on the opposite side from the inserting opening with respect to the turntable, jacket opening enlarging means provided in the vicinity of the inserting opening, capable of moving over the turntable between a position in the vicinity of the inserting opening and the innermost part of the reproducing apparatus, in response to an operation in which the disc case is inserted into and extracted from the reproducing apparatus, lowering and raising means (disc lifter) for lowering the disc to a position where the disc is placed onto the turntable (position possible to reproduce the disc, and hereinafter referred to as a lowered position) from a clamping position where the disc is clamped by the clamping means upon starting of the reproduction (position possible to support and recover the disc, and hereinafter referred to as a raised position) and raising the disc to the clamping position from the turntable upon finishing or discontinuing of the reproduction, a reproducing transducer for reproducing the disc placed onto the turntable, and moving means for moving the reproducing transducer from a waiting position to a reproducing position with respect to the disc.

In the above proposed reproducing apparatus, the recovery of the disc into the disc case is normally performed when the disc lifter is in the raised position, the disc is supported at the raised position, and an empty disc case is inserted into and then extracted from the reproducing apparatus. On the other hand, if the disc lifter is in the lowered position, the disc will not be recovered into the disc case even when the empty disc case is inserted into and then extracted from the reproducing apparatus. Moreover, in addition to the disc not being recovered, the disc within the reproducing apparatus may be damaged by the insertion and extraction of the disc case.

Accordingly, a reproducing apparatus provided with an erroneous insertion preventing mechanism was proposed in a United States patent application Ser. No. 294,360 filed Aug. 19, 1981, entitled "ROTARY RECORDING MEDIUM REPRODUCING APPARATUS" in which the assignee is the same as that of the present application. In this proposed reproducing apparatus, if the operator erroneously attempts to insert the disc case into the reproducing apparatus when the disc lifter is in the lowered position, the erroneous insertion preventing mechanism prevents the disc case from being inserted when the disc case is inserted halfway into the reproducing apparatus. The erroneous insertion preventing mechanism comprises an angularly rotatable cam operating together with the raising and lowering of the disc lifter, and an erroneous insertion preventing lever which rotates angularly according to the angular rotation of the cam, having one end protruding into a moving path of a pin which moves unitarily with the above jacket opening enlarging means. The above erroneous insertion preventing lever rotates angularly to an operational position while the disc lifter is moving down, to prevent the erroneous insertion of the disc case.

In order to protect the disc and stably carry out the operation, the disc lifter is raised and lowered with a speed which is slow to a certain extent. Hence, it takes approximately two seconds for the disc lifter to move to the lowered position from the raised position. Accordingly, the erroneous insertion preventing mechanism cannot be set to the operational position immediately after the disc lifter starts to move down, and it takes a certain time period before the erroneous insertion preventing mechanism is set to the operational position.

On the other hand, there may be a situation where the operator realizes that the disc is not the disc the operator intended to reproduce, after the reproducing operation is started. In this case, the operator inserts an empty disc case into the reproducing apparatus so as to change the disc. If the empty disc case is inserted into the reproducing apparatus after a certain time period has elapsed from the start of the reproducing operation, no problems will be introduced because the above erroneous insertion preventing mechanism will be at the operational position. However, if an attempt is made to insert the empty disc case immediately after the reproducing operation is started, the empty disc case will be inserted into the reproducing apparatus since the erroneous insertion preventing mechanism will not be set at the operational position in time to prevent the insertion of the empty disc case. When the empty disc case is inserted in this manner, the disc case will scratch the upper surface of the disc which is being lowered. As a result, the signal recording surface on the upper surface of the disc will become damaged. In addition, the disc will not be recovered and will remain within the reproducing apparatus, even when the inserted empty disc case is extracted from the reproducing apparatus.

SUMMARY OF THE INVENTION

Accordingly, it is a general object of the present invention to provide a novel and useful rotary recording medium reproducing apparatus in which the above described problems have been eliminated.

Another and more specific object of the present invention is to provide a rotary recording medium reproducing apparatus designed to detect the start of a disc case insertion when a disc case is inserted into the reproducing apparatus following an extraction of the disc case, while a disc lifter is being lowered, so as to immediately raise the disc lifter. The reproducing apparatus of the present invention has superior effects, when the operator realizes that a wrong disc is loaded after the disc case is extracted from the reproducing apparatus and then immediately inserts the empty disc case into the reproducing apparatus to change the disc. That is, the start of the disc case insertion is detected, to raise the disc lifter and restore the disc to its raised position. Thus, similarly as in the case where the empty disc case is inserted after completion of the reproduction, the disc is normally recovered within the disc case without having the signal recording surface damaged by the inserted disc case.

Other objects and further features of the present invention will be apparent from the following detailed description when read in conjunction with the accompanying drawings.

DETAILED DESCRIPTION

Figure 1:
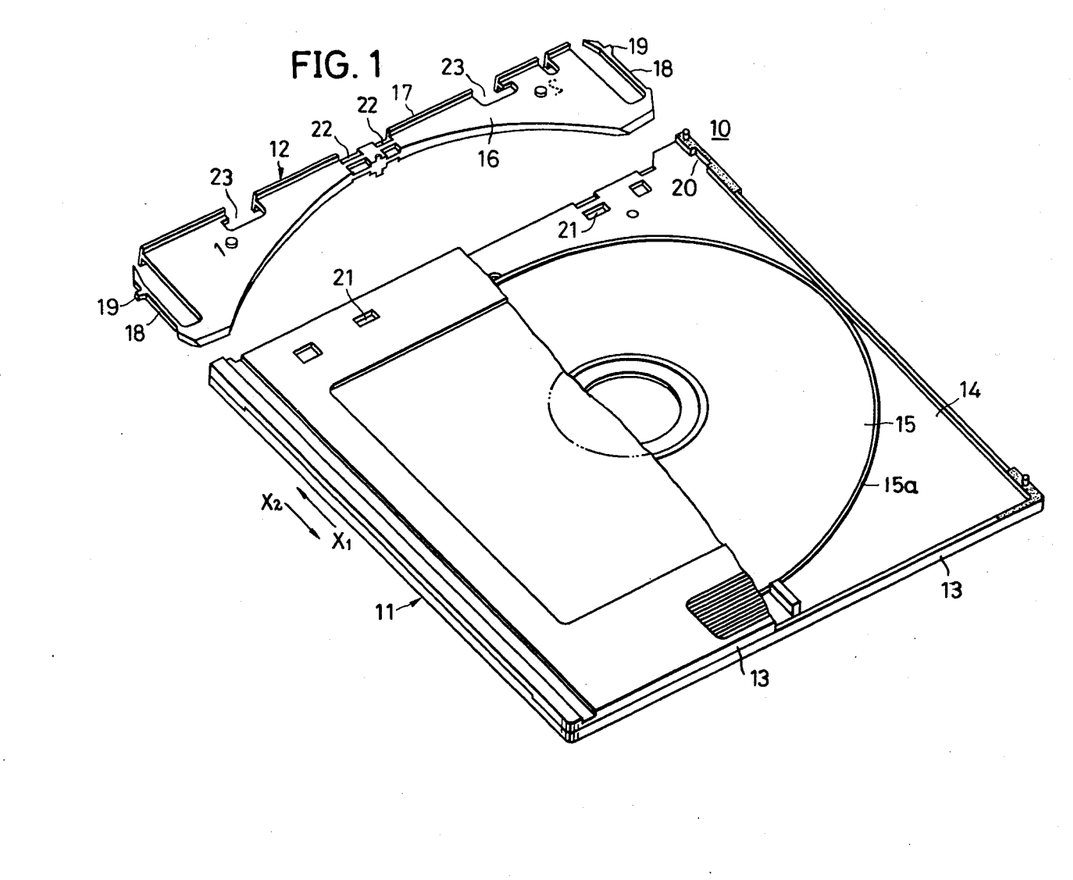
FIG. 1 is a perspective view, with a part cut away and disassembled, showing an example of a disc case which operates together with a rotary recording medium reproducing apparatus according to the present invention.

FIG. 1 shows an example of a disc case which operates together with the reproducing apparatus according to the present invention. A disc case 10 comprises a jacket 11 and a lid plate 12. The jacket 11 is assembled from a pair of jacket halves 13 and 13, and comprises a flat cavity or space 14 therein. This space 14 accommodates a disc 15. The lid plate 12 comprises a plate-shaped main lid body 16, and a rim portion 17 formed unitarily at the front edge of the main lid body 16. A pair of engaging arms 18 are formed on both sides of the main lid body 16. The main lid body 16 of the lid plate 12 is inserted into a predetermined position within the jacket 11. Moreover, projections 19 of the engaging arms 18 engage into depressions 20, and thus, the lid plate 12 engages with the jacket 11.

Figure 2:
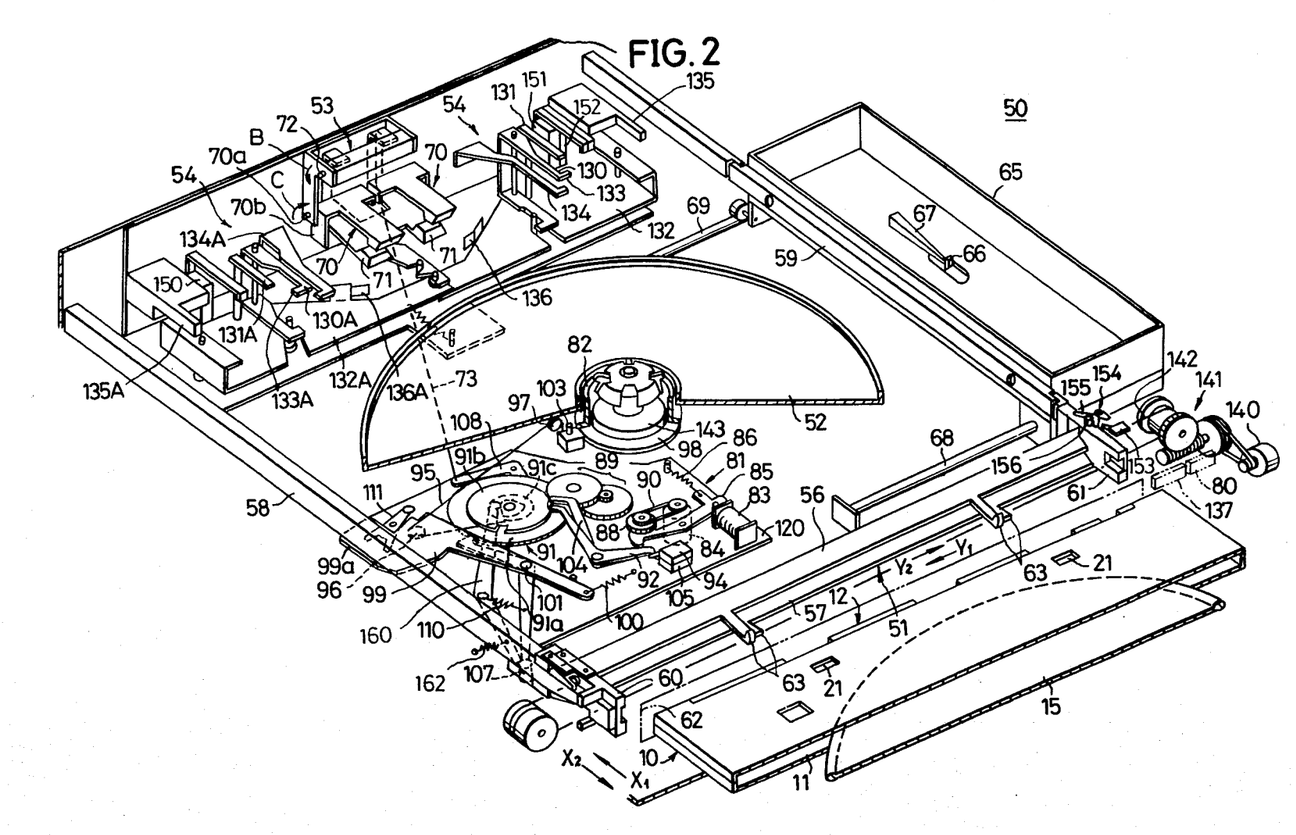
FIG. 2 is a perspective view, with a part cut away, showing the inner construction of an embodiment of a rotary recording medium reproducing apparatus according to the present invention.

A reproducing apparatus 50 shown in FIG. 2 is designed so that in its basic state, a disc lifter is in a lowered position. Every time the disc case 10 is to be inserted into the reproducing apparatus 50, a load-eject button is pushed to operate an elevator motor and raise the disc lifter. When the disc case 10 is inserted into and then extracted from the reproducing apparatus 50, the elevator motor operates again and lowers the disc lifter. The reproducing apparatus 50 substantially comprises a jacket opening enlarging mechanism 51, a turntable 52 for rotating the disc 15 placed thereon, a disc clamping mechanism 53 for clamping the disc 15, a lid plate locking mechanism 54 for locking the lid plate 12, and the like.

The jacket opening enlarging mechanism 51 comprises upper and lower beams 56 and 57 extending in the directions of arrows Y1 and Y2, and sliders 60 and 61 which are respectively inserted fixedly into guide rails 58 and 59, to move along the guide rails 58 and 59. The jacket opening enlarging mechanism 51 is guided by the guide rails 58 and 59, and moves between an innermost part of the reproducing apparatus 50 and a disc case inserting opening 62 provided at the frame of the reproducing apparatus 50, in the directions of arrows X1 and X2.

Enlarging fingers 63 are respectively formed on each of the beams 56 and 57, directed towards the inserting opening 62. When each of the beams 56 and 57 are positioned on the side of the inserting opening 62, the enlarging fingers 63 mutually close upon each other, and when the beams 56 and 57 move in the direction of the arrow X1, the enlarging fingers 63 angularly rotate in upward and downward directions so as to mutually separate from each other.

A pickup frame 65 is provided with a reproducing stylus 66 and a cantilever 67, and moves in the directions of the arrows Y1 and Y2 along a pair of guide rods 68 and 69.

The disc clamping mechanism 53 and the lid plate locking mechanism 54 are constructed symmetrically on the right and left sides with respect to a line which passes through the center of the turntable 52 in the direction of the arrows X1. The parts on the left side are designated by the same reference numerals as the corresponding parts on the right side, with a subscript "A", and their description will be omitted.

The disc clamping mechanism 53 is provided at the inner part of the reproducing apparatus 50 on the opposite side of the inserting opening 62, and comprises a pair of upper and lower clamping fingers 70 and 71. The lower clamping finger 71 is axially supported on an upper pin 72. A wire 73 is linked to the clamping finger 71, and the clamping finger 71 receives a rotational force in the direction of an arrow B due to the force of a spring 74. Accordingly, the clamping finger 71 receives a force urging angular rotation in the upward direction. The upper clamping finger 70 is axially supported by a pin 70a.

Upon reproduction of the disc 15, the disc case 10 is inserted through the inserting opening 62 of the reproducing apparatus 50, by inserting the disc case 10 with the side of the lid plate 12 into the direction of the arrow X1.

Figure 3:
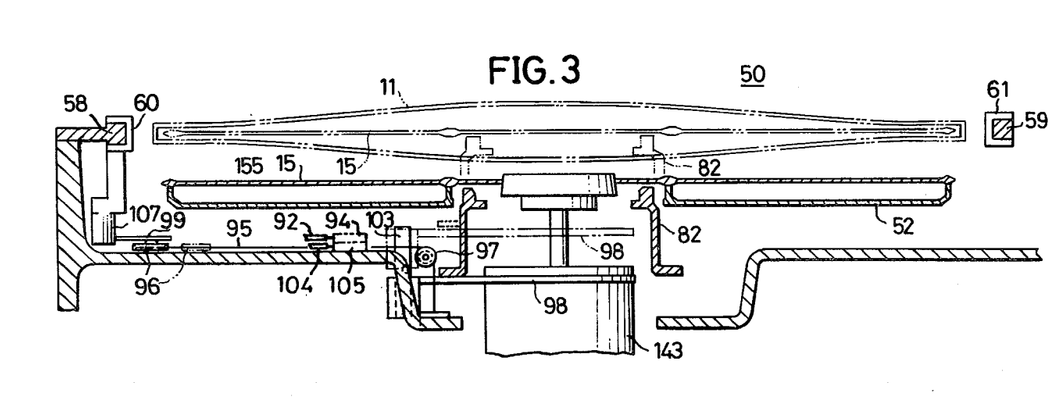
FIG. 3 is a schematic elevation, in vertical cross section, showing the reproducing apparatus shown in FIG. 2.

Upon insertion of the disc case 10, a load-eject button 80 is pushed. Responsive to this operation, a disc lifter elevator mechanism 81 changes from a state shown in FIGS. 2 and 4 to a state shown in FIG. 5. At first, a disc lifter 82 (disc supporting member) is at the lowered position, that is, at a position capable of reproducing the disc 15, as shown in FIGS. 2 and 3. When the button 80 is pushed, a plunger 83 is energized, and a D.C. elevator motor 84 starts to rotate in a forward direction. Description on a driving circuit for this motor 84 will be given hereinafter. When the plunger 83 is energized, a rotatable lever 85 angularly rotates clockwise about a pin 87 against a force exerted by a spring 86, and hence, a gear 88 supported on the lever 85 meshes with reduction gears 89. This gear 88 is rotated clockwise by the elevator motor 84 by way of a belt 90. The rotation of the gear 88 is transmitted by way of the reduction gears 89 to a gear part 91a of a cam-gear structure 91 which rotates counterclockwise at a reduced speed.

When the cam-gear structure 91 rotates by an angle of approximately 140°, a beak at the end of a first switch arm 92 enters into a first depression 91b-1 of a disc cam 91b, and this arm 92 rotates counterclockwise about a pin 93 to turn OFF a first micro-switch 94. When this micro-switch 94 is turned OFF, the elevator motor 84 is cut off from the power source and stops rotating. This motor 84 thus stopped, then serves as a load against the reverse rotation of the cam-gear structure 91 which is maintained stopped at the angularly rotated position.

As the cam-gear structure 91 rotates angularly, a wire 95 is taken up by a reel 91c. The tensioned wire 95 is guided by pulleys 96 and 97, and is linked to a U-shaped elevator plate 98 resting at the lowered position. The pulley 96 provided on a lifter elevating lever 99, is urged to angularly rotate counterclockwise about a pin 101 by a spring 100, and is engaged with a stopper pin 102. This lifter elevating lever 99 is provided in an unrelated manner with respect to the cam-gear structure 91, and angularly rotates independently from the cam-gear structure 91. As the wire 95 is taken up by the reel 91c, the elevator plate 98 is pulled upwards and moves upwards along a guide post 103. Hence, the disc lifter 82 is pushed upwards to a raised position indicated by a two-dot chain line in FIG. 3.

A beak of a second switch arm 104 slips out from a second depression 91b-2 of the disc cam 91b. The arm 104 angularly rotates clockwise to cause a second micro-switch 105 positioned below the first micro-switch 94 to become turned ON. Here, the first and second micro-switches 94 and 105 operate together to constitute a disc lifter position detector which will be described hereinafter. When the first micro-switch 94 is OFF and the second micro-switch 105 is ON, a microcomputer recognizes that the disc lifter 82 is at the raised position. In a state before the load-eject button 80 is pushed, the disc lifter position detector recognizes that the disc lifter 82 is at the lowered position where it is possible to start reproduction, because the first micro-switch 94 is ON and the second micro-switch 105 is OFF.

The cam-gear structure 91 is then at the position where a depression 91a-1 of the gear 91a confronts a beak 106a of a lifter lock lever 106. At this point, an end 106b of the lifter lock lever 106 is engaged with a cylindrical pin member 107 projecting downwards from the slider 60 which is positioned at the front of the reproducing apparatus 50, so that the beak 106a does not enter into the depression 91a-1. Furthermore, a cam 91d angularly rotates an L-shaped clamp control arm 108 counterclockwise about a pin 109. As a result, the wire 73 is pulled to cause the clamping fingers 70 and 71 to assume the state capable of clamping the disc 15.

When the reproducing apparatus 50 assumes the above described state, the disc case 10 is inserted into the reproducing apparatus 50. By this insertion of the disc case 10, the jacket opening enlarging mechanism 51 is pushed and moved in the direction of the arrow X1 by the disc case 10. As the enlarging mechanism 51 moves, the upper and lower beams 56 and 57 respectively rotate angularly, and the enlarging fingers 63 thus respectively move in directions so as to mutually separate from each other. Accordingly, the tip ends of the enlarging fingers 63 engage with engaging windows 21 of the jacket 11, and enlarge the front part of the upper and lower jacket halves 13 upwards and downwards, to enlarge the opening of the jacket 11.

In addition, as the disc case 10 is inserted, the pin member 107 moves from a position indicated in FIG. 2 towards the direction of the arrow X1. When the pin member 107 moves from the above original position, the lifter lock lever 106 is released from the engagement with the pin member 107. Thus, the lifter lock lever 106 angularly rotates clockwise due to a spring 110, and the beak 106a enters into the depression 91a-1 to lock the cam-gear structure 91 at this rotated position. The end part 106b of the lifter lock lever 106 enters within a path 112 of the pin member 107.

Figure 5:
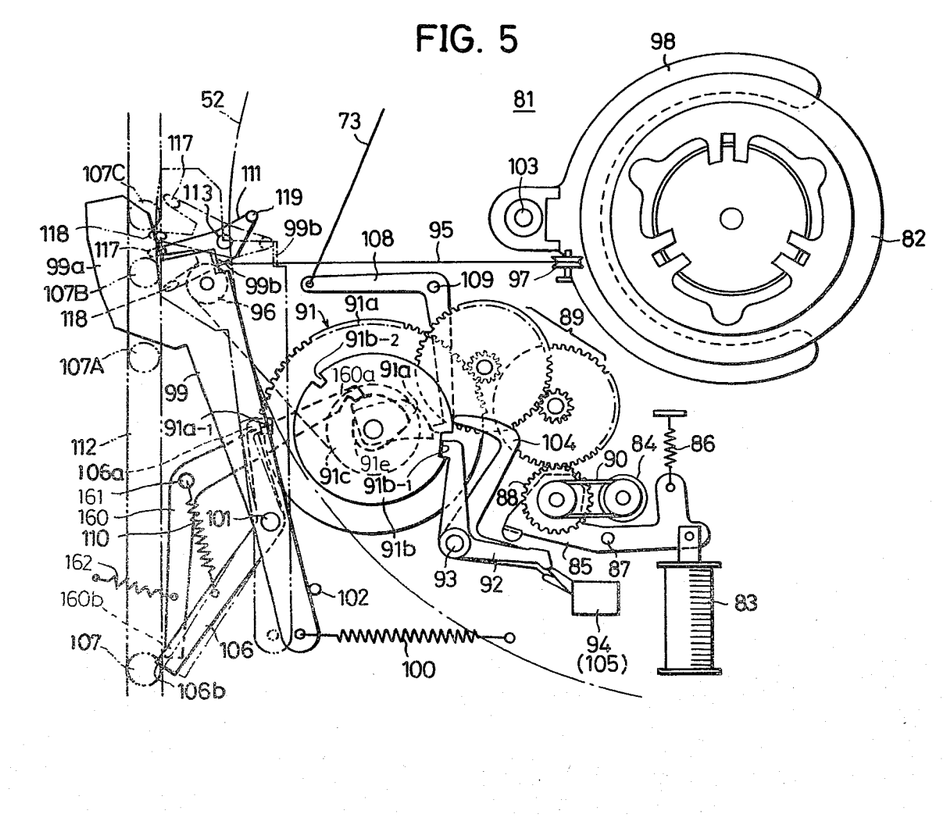

This pin member 107 moves along the moving path 112 as indicated by positions 107A→107B→107C in FIG. 5. When the pin member 107 moves, the pin member 107 makes contact with and pushes aside a cam part 99a of the lifter elevating lever 99, to angularly rotate the cam part 99a clockwise against the force exerted by the spring 100, up to a position indicated by a two-dot chain line in FIG. 5. The lever 99 is then locked by a lock lever 111.

Accompanied by the angular rotation of the lever 99, the pulley 96 shifts to a position indicated by a two-dot chain line in FIGS. 3 and 5. The pulley 96 guides the wire 95 stretched across between the elevator plate 98 and the cam-gear structure 91 at an intermediate position. As a result, slack is introduced in the wire 95, and both the disc lifter 82 and the elevator plate 98 accordingly move downwards due to their own weights, to retreat from the disc insertion path.

Before the disc case 10 is inserted, the lock lever 111 assumes the position angularly rotated counterclockwise, and a pin 117 is within the path 112. As the disc case 10 is inserted, this pin 117 is pushed or kicked by the pin member 107 moving in the direction of the arrow X1, to forcibly rotate the lock lever 111 angularly to assume the position angularly rotated clockwise. By this angular rotation of the lock lever 111, a bent lug 99b of the lifter elevator lever 99 becomes engaged with a lock pin 119, and the lifter elevator lever 99 accordingly becomes locked at the position angularly rotated clockwise. The pin 117 retreats from the path 112 and a pin 118 enters within the path 112.

Referring back to FIG. 2, when the disc case 10 is inserted into the innermost part of the reproducing apparatus 50 together with the enlarging mechanism 51, through the upper side of the turntable 52, ride-over parts 22 of the lid plate 12 enter between the clamping parts which are provided at positions mutually opposite to the clamping fingers 70 and 71, and pass through these clamping parts by pushing and spreading these parts. The clamping fingers 70 and 71 close, as will be described hereinafter, after the ride-over parts 22 of the lid plate 12 have passed through, and the clamping parts accordingly clamp a groove guard 15a of the disc 15.

Accompanied by the insertion of the disc case 10, locking fingers 130 and 130A relatively enter inside L-shaped cutouts 23 of the lid plate 12, and the rim portion 17 accordingly pushes contact fingers 131 and 131A. When the contact fingers 131 and 131A are pushed by the lid plate 12, main levers 132 and 132A respectively rotate angularly to be latched. Further, the locking fingers 130 and 130A angularly rotate in directions so as to mutually separate from each other, and L-shaped parts 133 and 133A provided at the tip ends of the above locking fingers 130 and 130A respectively enter into the innermost parts of the cutouts 23, to lock the lid plate 12. The lid plate 12 is limited of its movement in the direction of the arrow X1 by the contact fingers 131 and 131A, and the lid plate 12 is thus locked and supported at the innermost part of the reproducing apparatus 50 in a state where the lid plate 12 is placed and supported on supporting fingers 134 and 134A.

In addition, engagement releasing members 135 and 135A enter inside the openings on the right and left sides of the disc case 10, and push sloping surfaces at the tip ends of the engaging arms 18. Accordingly, the engaging arms 18 are respectively distorted inwards, and the projections 19 respectively slip out from the depressions 20, to release the engagement of the lid plate 12 with respect to the jacket 11.

When the main levers 132 and 132A rotate angularly to positions where they are latched, leaf springs 136 and 136A respectively provided at the bent parts of the main levers push against a vertically extending part 70b of the upper clamping finger 70. Hence, a rotational force in the direction of an arrow C is applied to the clamping finger 70. Thus, the disc 15 is clamped at a predetermined height by the lower clamping finger 71 and the upper clamping finger 70.

Accordingly, when the disc case 10 is inserted into the final position, the engagement of the lid plate 12 with respect to the jacket 11 is released. The disc case 10 thus becomes locked by the locking fingers 130 and 130A, and the disc 15 is clamped by the clamping fingers 70 and 71.

Next, the jacket 11 is extracted in the direction of the arrow X2. Since the lid plate 12 and the disc 15 are respectively locked and clamped as described above, only the jacket 11 is moved in the direction of the arrow X2, leaving behind the lid plate 12 and the disc 15. Accompanied by this extraction of the jacket 11, the lid plate 12 and the disc 15 are relatively pulled out from within the jacket 11. When the jacket 11 moves in the direction of the arrow X2, the jacket opening enlarging mechanism 51 also moves together with the jacket 11, in the direction of the arrow X2.

When the jacket 11 is extracted halfway, the pin member 107 moving in the direction of the arrow X2 pushes the pin 118 aside to angularly rotate the lock lever 111 counterclockwise. The lifter elevating lever 99 is accordingly released from the locked state, and angularly rotates counterclockwise due to the force exerted by the spring 100. Accompanied by the angular rotation of the lever 99, the wire 95 is pulled, and the disc lifter 82 again moves up to the raised position, to support the center part of the disc 15. In this state, the disc 15 is supported horizontally at a position above the turntable 52, by the clamping fingers 70 and 71 and the disc lifter 82. When the jacket 11 is further extracted, the disc 15 completely separates from the jacket 11, the jacket opening enlarging mechanism 51 returns to its original position, and the jacket opening enlarging fingers 63 respectively rotate angularly in directions so as to mutually close upon each other and separate from the engagin windows 21. The jacket 11 thus returns to its original state due to its flexibility, and the enlarged opening also returns to the original state. Therefore, the jacket 11 is completely extracted from the reproducing apparatus 50.

Micro-switches 150, 151, and 152 which operate together with the rim portion 17 of the lid plate 12, for indicating whether the disc case is inserted and indicating the type of signal recorded on the disc, are provided at the innermost part of the reproducing apparatus 50. When the disc 15 is left within the reproducing apparatus 50 as described above, one of the micro-switches 150 through 152 is turned ON by the lid plate 12 which is locked by the locking fingers 130 and 130A, and produces a signal.

As the slider 60 returns to the original position, the pin member 107 pushes aside the end part 106b of the lifter lock lever 106. Thus, the lifter lock lever 106 assumes the original state indicated in FIG. 4, where the beak 106a slips out from the depression 91a-1. The cam-gear structure 91 is accordingly released from the locked state by the lifter lock lever 106. In addition, because the slider 60 is returned to the original position, an opener switch (micro-switch) 153 becomes turned ON as will be described hereinafter.

A control circuit for controlling the disc lifter elevator motor 84 is operated by the output from one of the micro-switches 150 through 152 and the output of the opener switch 153. As a result, the elevator motor 84 automatically starts to rotate in the reverse direction. By the reversal of the elevator motor 84, the cam-gear structure 91 angularly rotates clockwise from the position indicated in FIG. 5 up to the original position indicated in FIG. 4. The cam-gear structure 91 is locked by a beak part at the tip end of the rotatable arm 104 entered into the depression 91b-2. The rotatable arms 92 and 104 then assume the state indicated in FIG. 4, and the micro-switches 94 and 105 are switched over. Hence, the motor 84 stops and the plunger 83 is de-energized. As a result of the angular rotation of the cam-gear structure 91, the control arm 108 rotates clockwise to slacken the wire 73. Accordingly, the clamping finger 71 rotates in a direction opposite to the direction of the arrow B, to release the clamping with respect to the disc 15. As another result of the angular rotation of the cam-gear structure 91, the wire 95 is pulled out from the reel 91c, and the disc lifter 82 moves downwards. Therefore, the disc 15 moves down and is placed onto the turntable 52. When a play button 137 is pushed thereafter, a motor 140 starts to rotate to cause a wire belt 142 to travel by way of a worm gear 141. Hence, the pickup frame 65 moves in the direction of the arrow X1 from the waiting position. In addition, the turntable 52 is rotated by a motor 143. Thus, the disc 15 is relatively scanned by the reproducing stylus 66 which reproduces the information signal.

The reproducing apparatus 50 is provided with an erroneous insertion preventing mechanism for preventing erroneous insertion of the disc case. A lever 160 is axially supported by a pin 161, and an end part 160a opposes a fan-shaped cam part 91e of the cam-gear structure 91. On the other hand, another end part 160b is positioned in the vicinity of the pin member 107 which is in the returned position, within the moving path 112.

Figure 4:
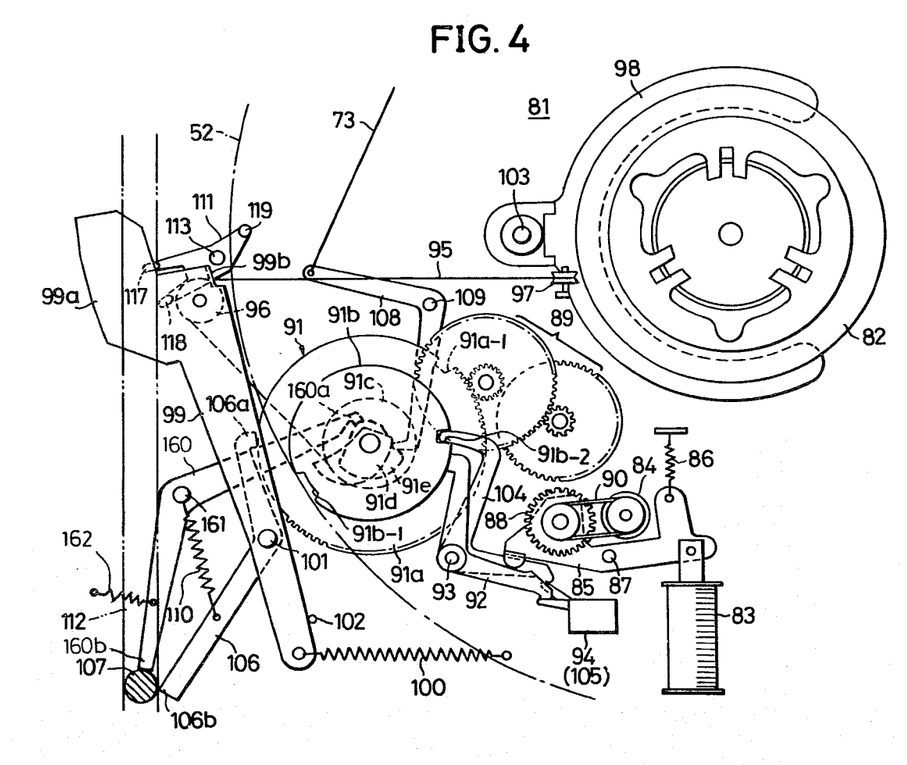
FIGS. 4 and 5 are plan views respectively showing one embodiment of a disc lifter elevator mechanism shown in FIG. 2, in a state before insertion of the disc case, and in a state where the disc lifter has elevated so as to allow insertion of the disc case.

When the disc lifter 82 is in the lowered position, the cam-gear structure 91 is at the angularly rotated position shown in FIGS. 2 and 4. Accordingly, a cam surface having a small diameter of the cam part 91e opposes the end part 160a of the lever 160. The lever 160 is angularly rotated clockwise by a spring 162, and the end part 160b enters within the moving path 112 to oppose the pin member 107.

As a result, the jacket opening enlarging mechanism 51 is put in a state restricted of movement in the direction of the arrow X1, and the operation in which the disc case 10 is inserted into the reproducing apparatus is accordingly restricted.

Next, description will be given with respect to an operation in which the disc 15 is recovered from within the reproducing apparatus 50.

When the load-eject button 80 is pushed during a reproducing mode, the motor 143 stops to stop the rotation of the disc 15. Moreover, the motor 140 rotates in the reverse direction to return the pickup frame 65 into the waiting position. The plunger 83 is energized and the elevator motor 84 starts to rotate. Hence, the disc lifter elevator mechanism 81 and the disc clamping mechanism 53 operate, similarly as in the above described disc loading mode. That is, the disc 15 is clamped at the groove guard 15a by the disc clamping mechanism 53, and is supported on the disc lifter 82 at the position above the turntable 52.

In addition, when the disc lifter 82 is raised, the cam-gear structure 91 is at the position shown in FIG. 5, and the large diameter cam surface of the fan-shaped cam part 91e opposes the end part 160a of the lever 160. Accordingly, the lever 160 angularly rotates counterclockwise against the force exerted by the spring 162, and the end part 160b retreats from the moving path 112.

Therefore, the restriction of movement in the direction of the arrow X1 with respect to the above enlarging mechanism 51 is released, and it becomes possible to insert the disc case 10 into the reproducing apparatus 50.

A lead-out signal recorded at the innermost peripheral part of the disc 15 is reproduced, when reproduction is performed up to the innermost peripheral part of the disc 15. Upon reproduction of the lead-out signal, the reproducing apparatus 50 operates in the same manner as in the case where the load-eject button 80 is pushed during the above described reproducing mode.

Upon recovering of the disc 15, the empty jacket 11 is inserted with its front end first into the reproducing apparatus 50 through the inserting opening 62. The jacket opening enlarging mechanism 51 is pushed by the jacket 11 and moves again in the direction of the arrow X1, to enlarge the opening of the jacket 11. Accompanied by the insertion of the jacket 11 in the direction of the arrow X1, the disc 15 is relatively inserted inside the jacket 11 through the opening of the jacket 11.

When the jacket 11 is inserted into the innermost position inside the reproducing apparatus 50, the disc 15 becomes completely incased within the jacket 11, and furthermore, the lid plate 12 closes the opening of the jacket 11 to engage with the jacket 11. Therefore, when the jacket 11 is extracted in the direction of the arrow X2, the lid plate 12 moves in the direction of the arrow X2 together with the jacket 11. The disc 15 is pushed by the lid plate 12, and is forcibly pushed out in the direction of the arrow X2 by the clamping part. As a result, the disc 15 separates from the reproducing apparatus 50 to be recovered within the disc case 10.

Accompanied by the moving of the enlarging mechanism 51, the lifter elevating lever 99, the lifter lock lever 106, and the lock lever 111 operate, similarly as in the above described disc loading operation.

Figure 6A:
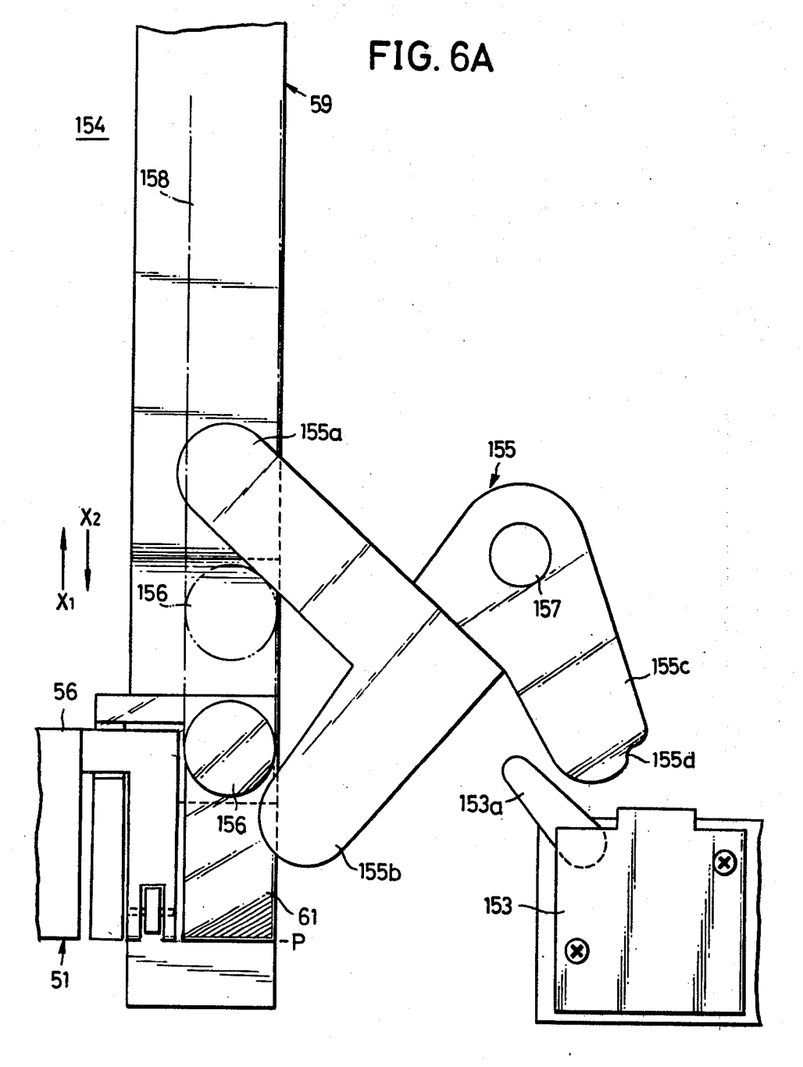
FIGS. 6A and 6B are enlarged plan views respectively showing states of an opener switch mechanism when the jacket opening enlarging mechanism is at a position at the inserting opening and when the jacket opening enlarging mechanism is at a position moved towards an innermost part of the reproducing apparatus from the position at the inserting opening.
Figure 6B:
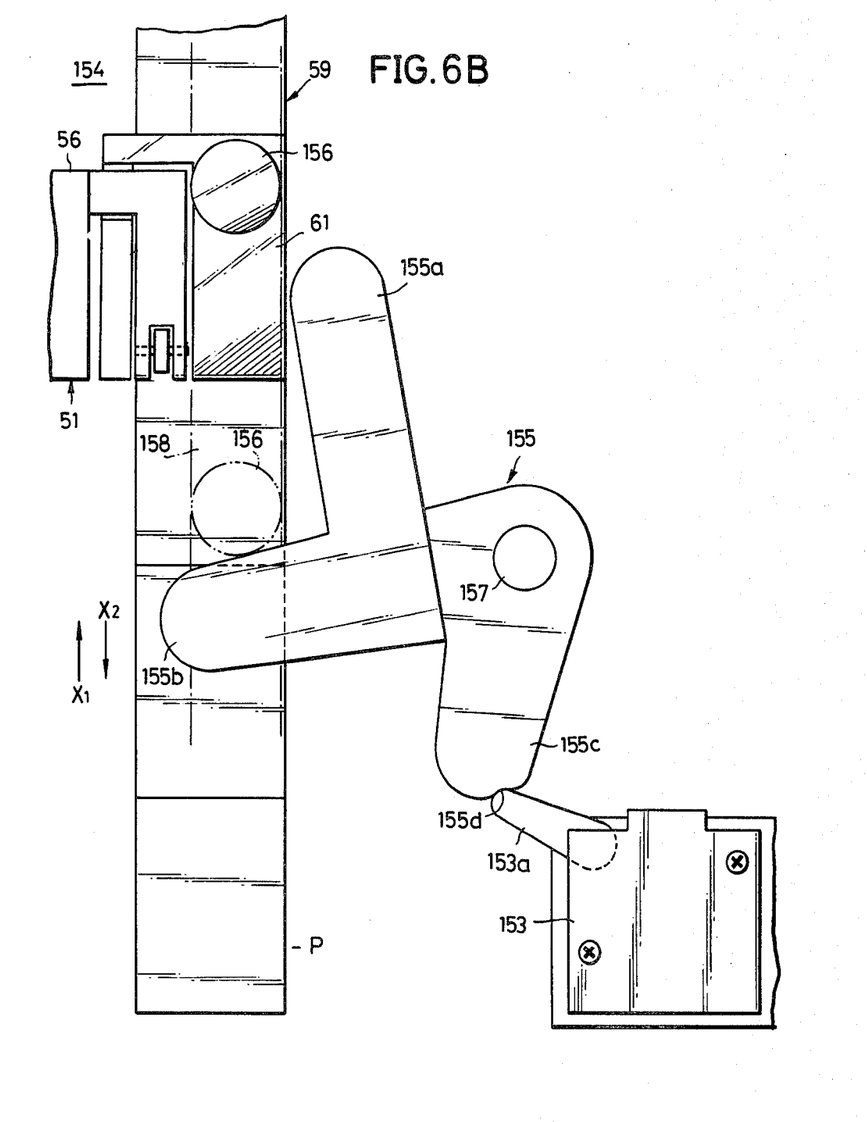

FIGS. 6A and 6B respectively show an opener switch mechanism. An opener switch mechanism 154 is provided at a position on the right side of the inserting opening 61, related to the position of the jacket opening enlarging mechanism 51, and comprises the opener switch 153, a rotary lever 155, and a locking pin 156. The opener switch 153 has a rotary operating member 153a. This rotary operating member 153a is urged to angularly rotate clockwise by a spring (not shown), and the opener switch 153 is OFF when the rotary operating member 153a is rotated clockwise as shown in FIG. 6A. On the other hand, the opener switch 153 is ON when the rotary operating member 153a is angularly rotated counterclockwise as shown in FIG. 6B. The above locking pin 156 is embeddedly provided on the upper surface of the slider 61.

The rotary lever 155 comprises a first arm portion 155a, a second arm portion 155b, and a third arm portion 155c, and is axially supported by a shaft 157 embeddedly provided on a chassis and the like. The first and second arm portions 155a and 155b are arranged so as to substantially form a V-shape, and are at a height position opposing the locking pin 156. The third arm portion 155c is at a height position opposing the opener switch 153.

In a state before the disc case 10 is inserted into the reproducing apparatus 50, the jacket opening enlarging mechanism 51 is at a position P at the inserting opening, as shown in FIGS. 2 and 6A. On the other hand, the switch mechanism 154 is in a state shown in FIG. 6A. That is, the locking pin 156 is positioned between the first and second arm portions 155a and 155b of the rotary lever 155, and the opener switch 153 is OFF. The rotary lever 155 is in a state free to rotate angularly within a certain angular range at the position angularly rotated clockwise. The first arm portion 155a is within a moving path 158 of the locking pin 156 indicated by a one-dot chain line in FIG. 6A.

When the disc case 10 is inserted into the reproducing apparatus 50, the jacket opening enlarging mechanism 51 is pushed towards the direction of the arrow X1 from the position P. As the enlarging mechanism 51 moves, the locking pin 156 reaches a position indicated by a two-dot chain line in FIG. 6A, where the locking pin 156 makes contact with the first arm portion 155a. When the enlarging mechanism 51 further moves towards the direction of the arrow X1, the locking pin 156 moves while pushing to move back the first arm portion 155a. Accordingly, the rotary lever 155 is angularly rotated clockwise to a position shown in FIG. 6B.

Due to the angular rotation of the rotary lever 155, the third arm portion 155c pushes the rotary operating member 153a to push this rotary operating member 153a counterclockwise against a force exerted by a spring (not shown). Hence, the opener switch 153 is switched ON. Therefore, the rotary lever 55 is stably maintained in the rotated position shown in FIG. 6B where the rotary operating member 153a is fitted into a cam 155d of the third arm portion 155c. Further, at this point, the second arm portion 155b of the rotary lever 155 enters within the moving path 158 of the locking pin 156. Due to the operation of the cam 155d and the rotary operating member 153a, the rotary lever 155 angularly rotates by an angle corresponding to an amount slightly larger than the amount pushed back by the locking pin 156. Hence, the first arm portion 155a completely retreats from the moving path 158 of the locking pin 156.

When the jacket 11 is extracted from the reproducing apparatus 50, the jacket opening enlarging mechanism 51 moves towards the direction of the arrow X2 in a state where the enlarging mechanism 51 is engaged with the jacket 11. The locking pin 156 moves beside the first arm portion 155a, and reaches a position indicated by a two-dot chain line in FIG. 6B where the locking pin 156 makes contact with the second arm portion 155b. Thus, the second arm portion 155b is pushed back by the locking pin 156, and the rotary lever 155 is angularly rotated clockwise.

In the state where the jacket 11 is extracted from the reproducing apparatus 50, the enlarging mechanism 51 and the switch mechanism 154 are in the state shown in FIGS. 2 and 6A. That is, the enlarging mechanism 51 is returned to the position P, and the opener switch 153 is OFF and detecting that the enlarging mechanism 51 has indeed returned to the position P.

Figure 7:
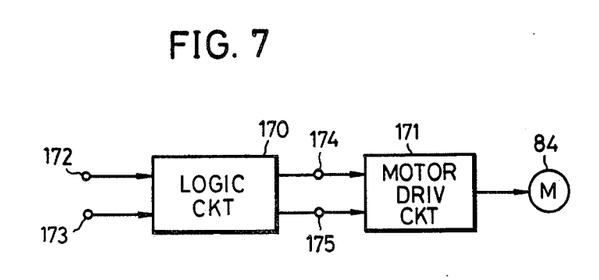
FIG. 7 is a systematic block diagram showing a circuit for controlling the operation of a D.C. elevator motor which operates the disc lifter elevator mechanism.

FIG. 7 shows a control system for controlling the operation of the above disc elevator mechanism (elevator motor 84).

Figure 8:
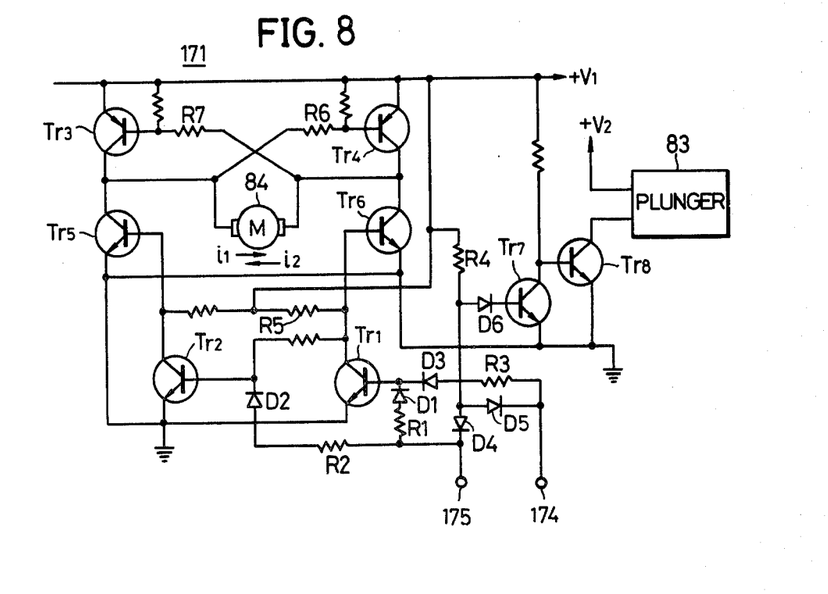
FIG. 8 is a circuit diagram showing a motor driving circuit in the block system shown in FIG. 7.

The elevator motor 84 is controlled by a logic circuit 170, and driven by a motor driving circuit 171. The motor driving circuit 171 is shown in FIG. 8, and will be described hereinafter. A disc existence detection signal (this signal exists when a disc is inside the reproducing apparatus and does not exist when the disc is unloaded outside the reproducing apparatus) obtained through an OR-circuit (not shown) which is provided at the output stage of the above micro-switches 150 through 152, is applied to one input terminal of the logic circuit 170. An opener switch signal obtained from the opener switch 153, is applied to the other input terminal of the logic circuit 170. The logic circuit 170 produces a motor driving signal according to the existence or non-existence of the above disc existence detection signal, and produces a motor rotational direction determining signal according to the opener switch signal. The motor driving signal assumes high level when the disc existence detection signal does not exist, and assumes low level when the disc existence detection signal exists. The motor rotational direction determining signal assumes low level when the opener switch 153 is OFF, and assumes high level when the opener switch 153 is ON.

If the disc 15 is supported on the disc lifter 82 which is at the raised position and the empty disc case 10 (jacket 11) is extracted outside the reproducing apparatus 50, the logic circuit 170 produces a motor driving signal in accordance with the existence of the disc existence detection signal, and a motor rotational direction determining signal in accordance with switching of the opener switch 153 which is switched OFF from the ON state. Thus, the motor driving circuit 171 operates, and the motor 84 automatically reverses. Moreover, the disc lifter 82 is lowered, and the disc 15 is placed onto the turntable 52. Here, as the disc lifter 82 is lowered, the above described erroneous insertion preventing mechanism operates. However, because of the shape of the fan-shaped cam 91e and the like, the erroneous insertion preventing mechanism is not set to the operational position immediately after the disc lifter 82 starts to move down. Hence, the erroneous insertion preventing mechanism is set to the operational position after the disc lifter 82 is lowered to a certain extent (the height position of the disc lifter 82 at this point will be referred to as an erroneous insertion preventing mechanism set position). Accordingly, if the operator realizes that a wrong disc has been loaded at a stage before the disc lifter 82 is lowered to the erroneous insertion preventing mechanism set position and inserts the empty disc case into the reproducing apparatus 50 so as to recover the disc 15, this insertion of the empty disc case cannot be prevented by the above erroneous insertion preventing mechanism. Therefore, the empty disc case will be inserted into the reproducing apparatus 50, and the disc 15 cannot be recovered within the disc case 10. Furthermore, the recording surface of the disc 15 will be damaged by the insertion of the disc case, as described above.

However, according to the present invention, the opener switch 153 is switched ON from the OFF state by the erroneous insertion of the empty disc case, and an opener switch signal in accordance with this switching of the opener switch 153 is supplied to the logic circuit 170. In addition, the logic circuit 170 produces a motor rotational direction determining signal in accordance with the opener switch signal supplied thereto. On the other hand, the motor driving circuit 171 is operated by a motor driving signal and the motor rotational direction determining signal from the logic circuit 170 obtained at this point. As a result, the rotational direction of the motor 84 is controlled and reversed, and the motor 84 then starts to rotate in the forward direction. Accordingly, the disc lifter 82 which is being lowered immediately begins to rise as the empty disc case is erroneously inserted. The disc 15 is therefore returned to the original raised position. Thus, the disc 15 is normally recovered within the empty disc case without damaging the recording surface of the disc 15.

Next, description will be given with respect to the operation of the motor driving circuit 171, by referring to FIG. 8. In FIG. 8, the motor rotational direction determining signal is applied to an input terminal 174, and the motor driving signal is applied to an input terminal 175.

In a state before the disc case 10 is inserted into the reproducing apparatus 50, where the load-eject button 80 is pushed and the disc lifter 82 is at the raised position, the enlarging mechanism 51 is at the returned position, and the opener switch 153 is OFF. Moreover, the level of the motor rotational direction determining signal applied to the input terminal 174 is low. In addition, there is no disc existence detection signal in this state, and the level of the motor driving signal applied to the input terminal 175 is high.

The incoming high-level signal to the input terminal 175 is applied to the base of an NPN type transistor Tr1, through a resistor R1 and a diode D1. Thus, the transistor Tr1 is turned ON. In addition, the above high-level signal applied to the input terminal 175 is simultaneously applied to the base of an NPN type transistor Tr2, through a resistor R2 and a diode D2. Hence, the transistor Tr2 is also turned ON.

The collectors of a PNP type transistor Tr3 and an NPN type transistor Tr5 are respectively connected one terminal of the motor 84, and are also connected to the base of a PNP type transistor tr4 through a resistor R6. On the other hand, the collectors of the transistors Tr4 and Tr6 are respectively connected to the other terminal of the motor 84, and also connected to the base of the transistor Tr3 through a resistor R7. Accordingly, among the transistors Tr3, Tr4, Tr5, and Tr6 constituting a bridge circuit, the transistors Tr5 and Tr6 are turned OFF when the transistors Tr1 and Tr2 are turned ON. Therefore, regardless of the level of the signal applied to the input terminal 174, a current does not flow to the motor 84. That is, even when the level of the signal supplied to the input terminal 174 becomes high, the motor 84 does not rotate.

When the disc 15 is supported on the disc lifter 82 which is at the raised position and left within the reproducing apparatus 50 and the empty disc case is extracted, the level of the motor driving signal applied to the input terminal 175 becomes low, and the level of the motor rotational direction determining signal applied to the input terminal 174 becomes low again.

The low-level signal applied to the input terminal 174 is applied to the base of the transistor Tr1, through a resistor R3 and a diode D3. Moreover, a diode D4 is simultaneously turned ON due to the low signal level at the input terminal 175. Hence, a positive power source voltage is applied to the base of the transistor Tr2, through a resistor R4, diode D4, resistor R2, and diode D2. Accordingly, the transistor Tr1 is turned OFF.

When the transistor Tr2 is turned ON, the base of the transistor Tr5 substantially becomes of ground potential. On the other hand, the positive power source voltage is supplied to the base of the transistor Tr6 through a resistor R5. Thus, the transistor Tr5 is turned OFF, and the transistor Tr6 is turned ON. In addition, when the transistor Tr5 is turned OFF, the collector potential of the transistor Tr5 and the base potential of the transistor Tr4 respectively rise, and the transistor Tr4 is turned OFF. On the other hand, the collector potential of the transistor Tr6 and the base potential of the transistor Tr3 decrease to a level below the power source voltage due to the ON state of the transistor Tr6. The transistor Tr3 is accordingly turned ON. As a result, the current obtained from the collector of the transistor Tr3 flows through the motor 84 and the transistor Tr6 as indicated by $i_1$ in FIG. 8. The motor 84 thus rotates in the reverse direction to lower the disc lifter 82.

When the empty disc case is inserted while the disc lifter 82 is being lowered and the enlarging mechanism 51 starts to move in the direction of the arrow X1 as described above (that is, when the insertion of the empty disc case is started), the opener switch 153 is switched ON from the OFF state. Hence, the level of the motor rotational direction determining signal supplied to the input terminal 174 changes to high level from low level. In addition, because the disc 15 exists within the reproducing apparatus 50, the low-level motor driving signal is continuously supplied to the input terminal 175. As a result, the transistors Tr1, Tr4, and Tr5 respectively become ON, and the transistors Tr2, Tr3, and Tr6 respectively become OFF, as is clear from the above description. Therefore, a current in the reverse direction flows to the motor 84 as indicated by $i_2$. The rotational direction of the motor 84 thus reverses and the motor 84 rotates in the forward direction to raise the disc lifter 82 which was being lowered. Accordingly, at the point where the empty disc case (jacket 11) is inserted to a position where the opening of the disc case closes upon the disc 15 in the plan view, the disc 15 is already returned to the original raised position, and the disc 15 can be normally recovered within the disc case 10.

If a low-level signal is applied to the input terminal 175, the signal supplied to the base of an NPN type transistor Tr7 through a diode D6 assumes low level. The transistor Tr7 is thus turned OFF, and an NPN type transistor Tr8 is turned ON. As a result, the plunger 83 is energized. That is, the plunger 83 is energized when the motor 84 rotates.

The motor driving circuit 171 is constructed so that the motor driving circuit 171 can also be used upon normal recovering of the disc and the like. That is, in a state where the disc lifter 82 is at the lowered position and the level of the signal applied to the input terminal 174 is high and the load-eject button 80 is pushed in order to load or recover the disc 15, the input signal level at the input terminal 175 becomes low. Accordingly, the transistors Tr1, Tr4, and Tr5 respectively are turned ON, while the transistors Tr2, Tr3, and Tr6 respectively are turned OFF. A current thus flows in the reverse direction to the motor 84 as indicated by $i_2$ in FIG. 8. Hence, the motor 84 rotates in the forward direction to raise the disc lifter 82.

The driving source for driving the disc lifter 82 is not limited to the above motor 84, and a plunger and the like may be used instead. In addition, the erroneous insertion preventing mechanism comprising the lever 160, the cam 91e, and the like, is not essential to the present invention. That is, the superior effects of the present invention can also be obtained when the disc lifter elevator control device constituting an essential part of the present invention is applied to a reproducing apparatus which is not provided with the above erroneous insertion preventing mechanism. Moreover, the above device constituting the essential part of the present invention can be applied similarly to a reproducing apparatus which is designed so that the disc lifter is lowered to reproduce the disc by manipulating a load-eject button after the disc case insertion and extraction operation is carried out in order to load the disc.

Further, the present invention is not limited to these embodiments, but various variations and modifications may be made without departing from the scope of the present invention.

What is claimed is:

1. A rotary recording medium reproducing apparatus for reproducing a rotary recording medium accommodated within a case, said case comprising a jacket provided with a space for accommodating said rotary recording medium and an opening for allowing said rotary recording medium to go in and out of said jacket, and a lid member inserted through said opening of said jacket for closing said opening of said jacket, said rotary recording medium reproducing apparatus comprising:
- an inserting opening through which said case is inserted;
- a turntable for rotating said rotary recording medium;
- lid member locking means and rotary recording medium clamping means respectively provided at an innermost part of said reproducing apparatus opposite to said inserting opening with respect to said turntable;
- jacket opening means provided in the vicinity of said inserting opening, capable of moving over said turntable between a position in the vicinity of said inserting opening and said innermost part of said reproducing apparatus, in response to an operation in which said case is inserted into and then extracted from said reproducing apparatus;
- a rotary recording medium supporting member provided at a center part of said turntable, capable of moving upwards and downwards independently of said turntable, for rising to support an inner peripheral part of said rotary recording medium so that said rotary recording medium is supported above said turntable;
- a supporting member elevator mechanism for elevating said rotary recording medium supporting member, said supporting member elevator mechanism operating so that said rotary recording member supporting member is in a raised state when said case or jacket is inserted into said reproducing apparatus;
- driving means for operating said supporting member elevator mechanism, said driving means operating in one direction to operate said supporting member elevator mechanism so that said rotary recording medium supporting member is raised, operating in a reverse direction to operate said supporting member elevator mechanism so that said rotary recording medium supporting member is lowered, and operating in the reverse direction after said rotary recording medium is supported above said turntable by said rotary recording medium supporting member; and
- control means for controlling said driving means to operate in said one direction when said control means detects the insertion of said jacket into said reproducing apparatus in a state where said rotary recording medium is supported by said rotary recording medium supporting member and is being lowered with said rotary recording medium supporting member operated by said driving means which is operating in said reverse direction.

2. A reproducing apparatus as claimed in claim 1 in which said control means comprises rotary recording medium existence detecting means for detecting the existence of said rotary recording medium within said reproducing apparatus; jacket insertion detecting means for detecting the start of the insertion of said jacket into said reproducing apparatus; and a control circuit operated in response to a rotary recording medium existence detection signal obtained from said rotary recording medium existence detecting means and a jacket insertion detection signal obtained from said jacket insertion detecting means in a state where said driving means is operating in said reverse direction, for reversing the operating direction of said driving means and operate said driving means in said one direction.

3. A reproducing apparatus as claimed in claim 2 in which said control circuit comprises a logic circuit supplied with said rotary recording medium existence detection signal and said jacket insertion detection signal, for producing a driving signal and a driving direction determining signal in accordance with the signals supplied thereto, said logic circuit producing a driving direction determining signal for reversing the operating direction of said driving means when supplied with said jacket insertion detection signal in a state where said rotary recording medium existence signal is supplied thereto; and a driving means driving circuit supplied with said driving signal and said driving direction determining signal from said logic circuit, for driving said driving means.

4. A reproducing apparatus as claimed in claim 2 in which said rotary recording medium existence detecting means detects the existence of said rotary recording medium by detecting whether said lid member of said case is being locked by said lid member locking means.

5. A reproducing apparatus as claimed in claim 2 in which said jacket insertion detecting means comprises a micro-switch for detecting the start of the movement of said jacket opening enlarging means towards said innermost part of said reproducing apparatus from said position in the vicinity of said inserting opening.

6. A reproducing apparatus as claimed in claim 1 in which said driving means is a D.C. motor rotating in a forward direction to operate said supporting member elevator mechanism so as to raise said rotary recording medium supporting member, and rotating in a reverse direction to operate said supporting member elevator mechanism so as to lower said rotary recording medium supporting member.

7. A reproducing apparatus as claimed in claim 3 in which said driving means is a D.C. motor rotating in a forward direction to operate said supporting member elevator mechanism so as to raise said rotary recording medium supporting member, and rotating in a reverse direction to operate said supporting member elevator mechanism so as to lower said rotary recording medium supporting member; and said driving circuit comprises a transistor bridge circuit including said D.C. motor, and a circuit part for controlling said bridge circuit.

* * * * *

UNITED STATES PATENT AND TRADEMARK OFFICE
CERTIFICATE OF CORRECTION

PATENT NO. : 4,467,464
DATED : August 21, 1984
INVENTOR(S) : Hiroyuki SUGIYAMA ET AL It is certified that error appears in the above-identified patent and that said Letters Patent is hereby corrected as shown below:

Claim 1, column 15, line 11, between "opening" and "means" insert -- enlarging --;

Claim 1, column 15, line 28, change "member" to -- medium --.

Signed and Sealed this

Twenty-second Day of April 1986

[SEAL]

Attest:

DONALD J. QUIGG

Attesting Officer

Commissioner of Patents and Trademarks